No. 895,742. PATENTED AUG. 11, 1908.
H. C. FRESHOUR.
TANK FLUSH VALVE.
APPLICATION FILED FEB. 17, 1908.

Witnesses.
H. A. Lamb.
S. W. Atherton.

Inventor
Henry C. Freshour
By Attorney

UNITED STATES PATENT OFFICE.

HENRY C. FRESHOUR, OF BRIDGEPORT, CONNECTICUT.

TANK FLUSH-VALVE.

No. 895,742.

Specification of Letters Patent.

Patented Aug. 11, 1908.

Application filed February 17, 1908. Serial No. 418,223.

*To all whom it may concern:*

Be it known that I, HENRY C. FRESHOUR, a citizen of the United States, residing at Bridgeport, county of Fairfield, State of Connecticut, have invented a new and useful Tank Flush-Valve, of which the following is a specification.

This invention relates to valves for the outlet or flush pipes of tanks and refers particularly to the type of valve which is seated by the pressure of water within the tank.

One of the objects of the invention is to provide a valve of this character which will not collapse and which cannot become elongated and jammed in the outlet pipe by the pressure of water in the tank, such pressure having the effect of spreading the valve outwardly against the upper portion of the seat instead of downwardly into or within the seat and outlet.

Another object of the invention is to provide a valve of this character having a portion which will always remain within the outlet so as to guide the valve portion when closing and insure its proper seating.

Other objects are to secure greater efficiency and durability and to provide for repairing a worn out valve by simply providing the float with a new cap which comprises the valve proper, as will be hereinafter described and then specifically pointed out in the claims hereunto appended.

Figure 1:
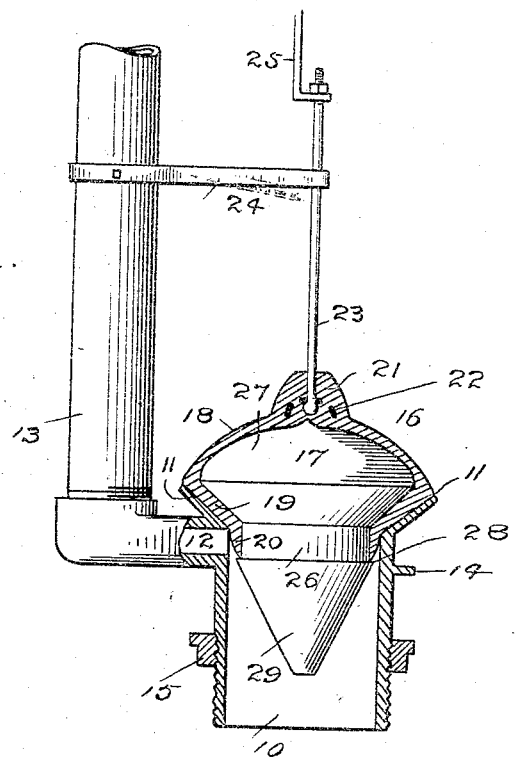
Figure 2:
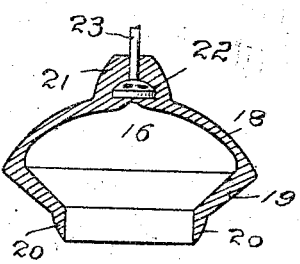
Figure 3:
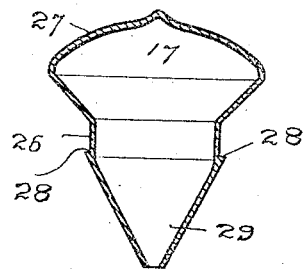

In the accompanying drawing forming a part of this specification, Figure 1 is an elevation partly in section, illustrating the construction and operation of my novel valve; Fig. 2 a vertical section of the cap detached; and Fig. 3 is a vertical section of the float detached.

10 denotes the outlet pipe which is provided with a valve seat 11 and a port 12 with which the overflow pipe 13 is connected. The outlet pipe is also shown as provided with a flange 14 which usually rests upon the upper surface of the bottom of a tank and with a nut 15 engaging the threaded lower portion of the pipe and adapted to be turned up against the under surface of the tank bottom. This structure is in common use and is only referred to for the purpose of illustrating the operation of my present invention, which relates only to the valve, said valve being adapted for use in connection with any ordinary or preferred type of valve seat and outlet pipe.

My novel valve comprises essentially a flexible cap, indicated by 16, and a float 17 over which the cap is placed and which may be either flexible or rigid, as preferred. That is to say, the float may be made of rubber, glass, metal, or any suitable material sufficiently rigid to prevent the valve from collapsing. It will be understood, of course, that when the float 17 is made of rubber or other flexible material, the pressure of water above the cap 18 may spread the latter more freely than would be permitted by a float made of glass or metal. If the float is made of glass or metal, the cap and its valve portion 19 will be the only portions to be spread by the pressure of water, but the material of said cap and its valve portion 19 is sufficiently thick to permit of enough spreading thereof to make a difference between a loose fit and a tight fit against the seat 11. The cap comprises essentially an enlarged upper portion, indicated by 18, a downwardly and inwardly tapering valve portion 19 which corresponds in configuration with the valve seat and below the valve seat with a circular lip 20 whose inner wall is vertical and whose outer wall tapers downward to meet the vertical inner wall, for a purpose presently to be explained. The upper portion of the cap is thickened as at 21 and has molded within it a plate 22 to which valve rod 23 is connected. The valve rod is shown as passing through a guide 24 extending from the overflow pipe, the connection by which the valve rod is lifted being indicated by 25.

The upper portion of the float, indicated by 27, is enlarged to correspond with the recess within the cap and tapers downward and inward to correspond with the valve portion of the cap. Below the portion of the float which corresponds with the valve portion of the cap is a cylindrical portion 26 which terminates in a shoulder 28. This shoulder projects slightly beyond the lower edge of lip 20, its function being to protect the edge of the lip so that it will not engage the edge of the valve seat when the valve drops down to place. Below shoulder 28 is a cone-shaped tip 29, the function of which is to secure the accurate seating of the valve. Should the valve descend slightly out of alinement with the seat, the tip will engage the inner edge of the seat and will center the valve causing it to register accurately with the seat at all times.

I do not claim herein an elastic bulb-valve having a guiding lower portion to enter an outlet pipe, an inverted cup-shaped upper portion, and an intermediate valve portion which tapers from the cup-shaped portion toward the ball guiding portion, as the same forms the subject matter of my application 829,677, filed Aug. 22, 1907.

Having thus described my invention I claim:

1. A tank flush valve comprising a float having an enlarged upper portion and a cone-shaped tip and a flexible cap covering the upper portion and having a valve portion adapted to engage a valve seat.

2. A tank flush valve comprising a float having an enlarged upper portion, a cone-shaped tip and intermediate the upper portion and the tip a cylindrical portion, and a flexible cap covering the upper portion and having a valve portion adapted to engage a valve seat, and a lip inclosing said cylindrical portion.

3. A tank flush valve comprising a float having an enlarged upper portion, a cone-shaped tip and intermediate the upper portion and the tip a cylindrical portion terminating in a shoulder and a flexible cap covering said upper portion and having a valve portion adapted to engage a valve seat and a lip inclosing the cylindrical portion, the lower edge of said lip lying within the shoulder.

4. A tank flush valve comprising a rubber float having an enlarged upper portion, a cone-shaped tip and intermediate the upper portion and the tip a cylindrical portion and a flexible cap covering said upper portion and having a valve portion adapted to engage a valve seat and a tapering lip inclosing the cylindrical portion.

In testimony whereof I affix my signature, in presence of two witnesses.

HENRY C. FRESHOUR.

Witnesses:
A. M. WOOSTER,
S. W. ATHERTON.